United States Patent
Roy

[11] 3,816,306
[45] June 11, 1974

[54] COPPER ETCHANT EFFLUENT TREATMENT

[76] Inventor: Clarence H. Roy, Oak Ridge Dr., Bethany, Conn. 06513

[22] Filed: Apr. 13, 1973

[21] Appl. No.: 350,834

Related U.S. Application Data

[63] Continuation-in-part of Ser. No. 254,933, May 19, 1972, abandoned.

[52] U.S. Cl.............. 210/49, 210/50, 210/61, 423/35, 423/42, 423/43, 156/19
[51] Int. Cl............................................ C02c 5/04
[58] Field of Search............. 210/49, 50, 59, 61, 63; 423/35, 42, 43; 156/19; 134/10, 13

[56] References Cited
UNITED STATES PATENTS

| | | | |
|---|---|---|---|
| 3,288,599 | 11/1966 | Keyes............................ | 156/19 UX |
| 3,400,027 | 9/1968 | Radimer et al..................... | 156/19 |
| 3,575,853 | 4/1971 | Gaughan et al.................... | 210/50 |

*Primary Examiner*—Samih N. Zaharna
*Assistant Examiner*—Benoit Castel

[57] ABSTRACT

The copper content of aqueous effluent containing the rinsings from the etching of copper containing substrates is reduced to less than about 5 ppm., by the steps of: (a) adjusting the pH of the effluent to no more than about 4.; (b) providing in the effluent, while vigorously agitating, hydrogen peroxide and a water soluble compound such as calcium chloride; and (c) adding to the reaction mixture as required an alkaline material such as lime or a water soluble salt of carbonic acid, in an amount effective to adjust the pH to at least about 8.

13 Claims, 1 Drawing Figure

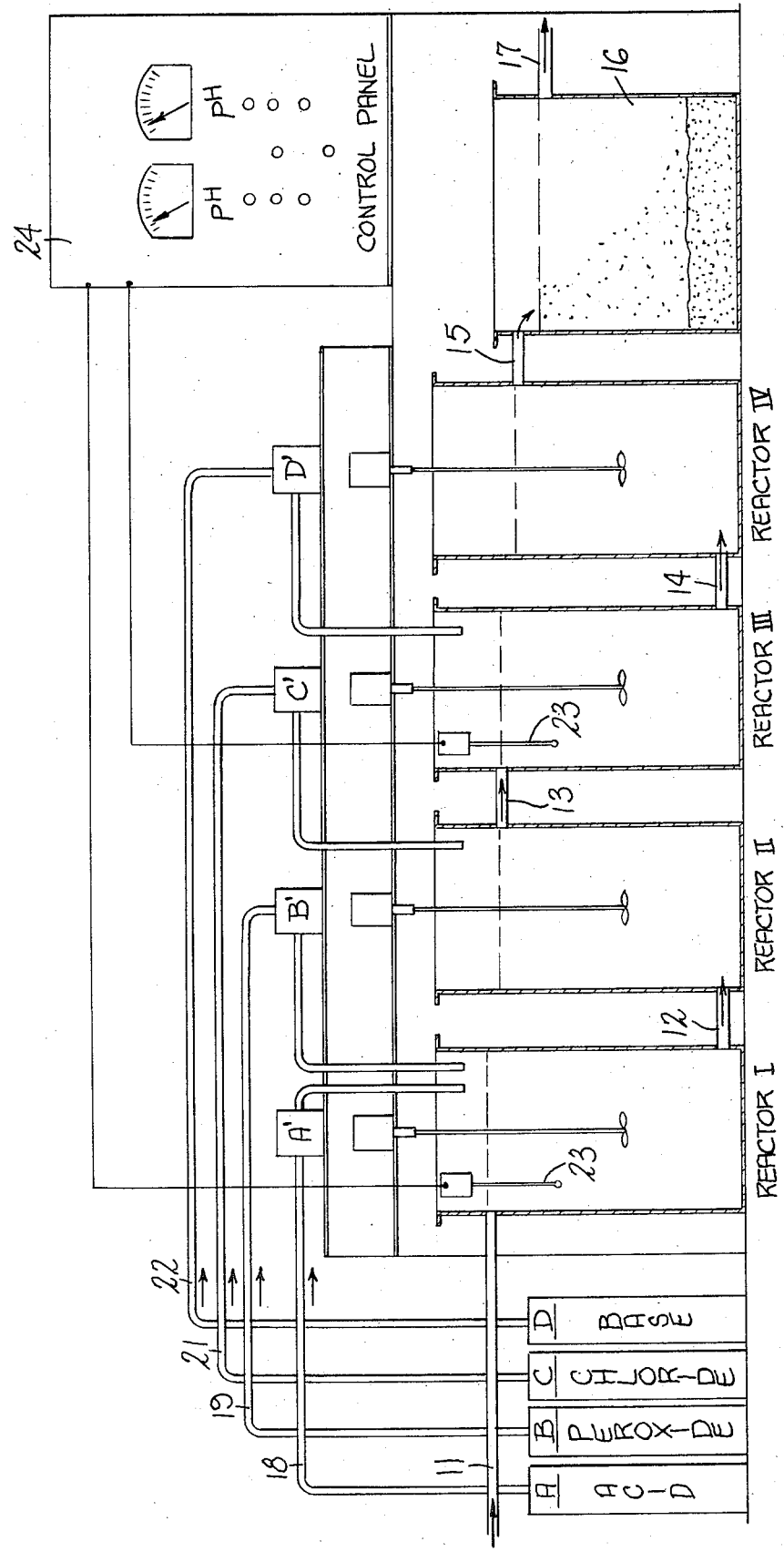

COPPER ETCHANT EFFLUENT TREATMENT

BACKGROUND OF THE INVENTION

This application is a continuation-in-part of U.S. Pat. application Ser. No. 254,933, filed May 19, 1972, now abandoned.

This invention relates to the treatment of industrial process waters containing copper values for the purpose of substantially removing such copper values as a source of pollution. More particularly, the invention relates to a process for treating aqueous effluents containing the rinsings from the etching of copper containing substrates in order to substantially remove copper ion as a source of pollution in such effluents.

Copper, usually in the form of copper compounds such as copper salts and oxides, is a common pollutant in effluents from industrial process waters. The copper compounds have a toxic effect upon marine life and vegetation, and therefore many municipalities and states have required reduction of the copper to non-toxic limits. In addition, it is often desirable to recover the copper and other values in the effluent for reuse of these values. Furthermore, it is desirable that the process waters can be recycled to various processing stages without damage to manufacturing equipment due to deposition of sludge and corrosive materials.

Representative of manufacturing operations resulting in copper containing effluents is the metal plating industry, such as the printed circuit board, electroforming and decoration industries. These operations frequently involve the electrolytic or electroless deposition of copper, either alone or in combination with other metals, upon a substrate such as a plastic or fibrous base material. With respect to electroless techniques, a variety of methods are employed having in common the step of applying an etchant solution to a copper clad substrate for the purpose of removing the copper from all areas except those where it is desired to leave a print or pattern in copper on the substrate. The etchant solutions commonly contain ammonia, cyanide and other compounds which form soluble complexes with the copper. In addition, the etchant solutions also usually contain strong oxidizing agents, surfactants and proprietary compounds which facilitate the complexing and rinse-removal of unwanted copper. The ammoniated etchant solutions often have copper dissolving capabilities of about one pound of copper per gallon of etchant solution, and often an even high capability depending upon the formulation. When the etchant solution is rinsed from the copper plated substrate the rinse waters thus contain considerable copper, often in amounts of 20-50 ppm. or more.

It is conventional to treat such effluents with caustic or lime but the rate and extent of precipitation of dissolved copper has failed to meet the more stringent water quality standards now prevailing in most municipalities and states.

In many instances, also, the etchant effluents are already highly alkaline and the copper complexing reagents therein prevent effective precipitation of the copper by caustic treatment. In other cases, where the etching or other treatment involves the use of peroxide releasing compounds such as ammonium persulfate, often in admixture with sulfuric acid, the copper is commonly removed by the addition of caustic followed by boiling to drive out the ammonia. These treatments suffer from numerous disadvantages, including the use of cumbersome and expensive equipment, and often result in air pollution.

Although the copper can be removed from ammonium persulfate etchant rinses by the addition of calcium chloride followd by adjustment of the pH to 9 or higher, sometimes with the further assistance of flocculating agents, this treatment is not suitable for the more sophisticated etchant solutions containing a plurality of reagents, including proprietary organic complexing agents.

Accordingly, an inexpensive treatment which is useful for virtually any rinse waters containing copper ion would therefore be highly beneficial, since specialized formulation would not be necessary.

OBJECTS AND SUMMARY

An object of the invention is to provide a new and improved process for the treatment of industrial waters in order to substantially reduce the copper content thereof.

Still another object of the invention is to provide a new and improved process which is useful for the removal of copper compounds from aqueous effluents irrespective of the chemical nature of the effluent.

Another object is to provide a new and improved process for treating aqueous effluents containing the copper etchant rinsings from the manufacture of copper clad or plated printed circuit boards, so that the final effluent meets municipal, state and federal standards for copper content, and without adding pollutants to the atmosphere.

These and other objects, features and advantages of the invention will become apparent from the specification which follows.

In summary outline, the foregoing objects are achieved by a process in which an aqueous effluent, containing the rinsings from the etching of copper containing substrates, is treated by: (a) adjusting the pH of the effluent to not more than about 4.5; (b) providing in the effluent, while vigorously agitating the effluent, hydrogen peroxide and a water soluble compound of a metal more electropositive than copper in the electromotive series, and (c) adding to the reaction mixture as required an alkaline material selected from lime, a water soluble salt of carbonic acid, or a mixture of lime and said salt, in an amount effective to adjust the pH of the reaction mixture to at least about 8. Upon reaching pH 8 in step (c), the copper begins to precipitate from the reaction mixture, probably in the form of copper carbonates, hydroxides or hydrated oxides, leaving a supernatant from which copper and many other metal compounds have been substantially eliminated. The precipitation can be accelerated by the addition of known flocculating materials.

DETAILED DESCRIPTION

The aqueous effluents treated in accordance with the invention are any of the effluents from industrial processes involving copper containing materials and especially processes involving the copper plating of substrates, whether the plating process be electrolytic or electroless, and the removal of undesired copper. In such processes the excess copper is conventionally removed from the plates in the form of copper compounds, usually water soluble complexes of copper. For convenience in the following discussion the removal of copper from copper containing substrates is referred to as "etching," this term being used in a non-limiting sense to include various procedures for removing copper from unwanted areas on a substrate, whether by mechanical, electrical, chemical, or any combination of these methods. The term "copper" as used herein means ionic copper in the form of copper compounds such as copper salts and copper complexes.

While a great variety of copper containing aqueous effluents can be treated in accordance with the invention, the invention has special significance for the treatment of aqueous effluents resulting from an etching step in the manufacture of copper plated printed circuit boards, as described, for example, in U.S. Pat. No. 3,269,861 — Schneble et al. The etchant solutions are highly alkaline and conventionally contain ammonia, ammoniated compounds, proprietary complexing agents of various kinds, and oxidizing agents, such as sodium chlorite. Such etchant solutions have copper dissolving capabilities of the order of 2 pounds of copper as copper metal per gallon of etchant solution. As a result, the rinsings following the application of such etchants have extraordinarily high copper content which must then be reduced or removed to prevent water pollution. Because the copper is usually highly complexed it is difficult to "break" the complexes so that the copper ions may be completely precipitated.

In the first step of the process of the invention, the copper containing aqueous effluent is treated so as to adjust its pH to not more than about 4.5, unless the effluent is already sufficiently acidic. Since in most instances the effluent is alkaline, the pH will be adjusted by the addition of an acid, preferably by the addition of a mineral acid such as sulfuric acid. While sulfuric acid is preferred from the standpoint of economy and minimal gas evolution, other acids such as hydrochloric acid may be employed. The acid may be added in concentrated form but a dilute acid such as sulfuric acid may be used in order to minimize foaming due to oxygen evolution during the peroxide addition. The acidification assists in weakening or rupturing the bonds in the copper complexes usually present in the effluent, as evidenced by a change in color of the reaction mixture from pale blue to colorless, and this color change is a useful guide to the amount of acid needed for the pH adjustment.

Simultaneously with, or following the acidification, hydrogen peroxide and a water soluble compound of a metal more electropositive than copper in the electromotive series, are added to the reaction mixture while vigorously agitating. The vigorous agitation of the reaction mixture, which may be accomplished by any suitable means such as by an electric rotary mixer, is useful, in conjunction with maintaining the peroxide in a dilute concentration, to minimize foaming and floatation of reaction material. The peroxide and water soluble compound are added in amounts to provide dilute concentrations in the reaction mixture, and preferably both reagents are added as moderately concentrated solutions from feeder tanks at predetermined dosage rates. The amount of peroxide may be varied over a wide range but in most instances is selected to provide a concentration in the reaction mixture of about 0.01 – 1.0 percent v/v, based on the use of commercial 35 percent by weight hydrogen peroxide solution. In dosage rate terms, a feed of about 1–4 ml. hydrogen peroxide (35 percent) per gallon of effluent being treated will provide such concentrations.

The water soluble compound concentration in the reaction mixture likewise may vary widely but generally a concentration in the reaction mixture of about 0.01 – 1.0 percent w/v, based, for example, on the use of commercial 75 percent active calcium chloride, will suffice. In dosage rate terms, a feed of about 2–8g. calcium chloride (75 percent active) per gallon of effluent will provide an effective concentration. Dosages of other metal compounds can be adjusted accordingly. While it is believed that the metal ion in the metal compound assists in the removal of copper by displacing the copper ion in the copper complexes, thus making more copper available for precipitation, the water soluble compound concentration should not be too high since excessive amounts lead to formation of such quantities of sludge as to complicate disposal. It is also believed that the metal ion forms insoluble metal compounds upon the subsequent adjustment of the reaction mixture pH to 8 or higher as described below. It is therefore quite probable that this metal compound precipitate assists in breaking up the copper complex in the effluent by removing some of the ammonia in the complex as metal ammonium compounds, such as calcium ammonium carbonate, the freed copper ion then being adsorbed on the precipitating metal compounds. Generally, the reaction mixture during the peroxide and water soluble compound additions remains colorless.

In the third step of the process the pH of the reaction mixture is adjusted to at least about 8 by the addition as required of an alkaline material. This material is a water soluble salt of carbonic acid, lime, or a mixture of the salt and lime. The preferred carbonic acid salt is sodium carbonate but the potassium salt and other equivalent water soluble forms, such as sodium bicarbonate, may be used.

The water soluble metal compound added in the second step is any such compound, salt or complex containing a metal more electropositive than copper in the electromotive series, so that the metal will tend to displace copper from the copper compounds or complexes in the effluent being treated. The more common metals of this character are the alkali metals, the alkaline earth metals, and the metals of Groups IIB, IIIA, IVA, VIIB and VIII of the Periodic Table, such as sodium potassium, magnesium, calcium, zinc, aluminum, tin, manganese, iron, cobalt and nickel, including a plurality of such metals in the same compound. The compounds may be in the form of their water soluble salts, oxides, sulfides, hydroxides, or complexes. Among the salts may be mentioned nitrates, chlorates, acetates, halides, sulfates, carbonates, phosphates, borates, sulfites, chromates and arsenates, to the extent that such are water soluble. The preferred metal compounds are those which do not add polluting ions, or, if polluting, are easily removed. Such compounds include calcium chloride, calcium oxide (lime), aluminum chloride, aluminum sulfate, magnesium chloride, magnesium sulfate, ferrous sulfate, ferric chloride, potassium permanganate, ferric chloride, and mixtures of two or more of the foregoing.

The degree of water solubility of the foregoing compounds is not significant except from an economic standpoint. However, by suitable adjustment of process conditions, such as temperature and pressure, solubility may be increased as is well known. Normally, for overall economy, the more soluble compounds are preferred, such as the salts specifically set forth above.

It should be noted that calcium oxide (lime) serves the purpose of each of the second and third steps of the process. Accordingly, when this metal compound is used, a separate third step may be unnecessary, where the reaction mixture becomes sufficiently alkaline due to the lime addition alone. Nevertheless, more efficient treatment in some instances may be achieved by adding, after step (b), a different alkaline material, such as caustic alkali or sodium carbonate. It should therefore be apparent that the alkaline material will be added only "as required," that is, in some instances it will not be added at all, whereas in other cases (where the pH after the metal compound addition remains low), a substantial amount will be required.

Generally, ammonium should not be added in any step of the process (such as ammonium persulfate to provide hydrogen peroxide, or ammonium carbonate) since additional ammonium only serves to maintain the stability of the soluble copper complexes usually present. Optionally, the addition of the water soluble carbonic acid salt or lime may be accompanied by the addition of other bases, such as an alkali metal hydroxide, preferably sodium hydroxide, in order to accelerate the elevation of the pH. The amount of optional base may exceed the amount of added soluble carbonic acid salt or lime, and the ratio by weight of additional base to water soluble carbonic acid salt or lime (or mixture thereof) may vary from about 8:1 to 1:2, provided there is a sufficient amount of carbonate or hydroxide ion in the reaction mixture to assist in the precipitation of the copper.

Preferably, the pH is adjusted to 9–11. Upon adjustment of the pH to at least moderate alkalinity, the reaction mixture quickly changes from colorless to a colored hue, sometimes to blue followed by pale green or light brown. This color change serves as a guide to the amount of alkaline material to add. In continuous flow treatment, as described below, the intermediate blue color often is not observed, and as the green or tan color develops, a heavy precipitate of the same color forms.

The precipitate may be allowed to settle over a period of time but it is advantageous to add a flocculating agent to accelerate the settling and possibly to further lower the copper ion content of the supernatant. Such flocculants include ferric chloride singly or in combination with known organic polyelectrolytes. But whether a flocculant is employed or not, the process of the invention will consistently lower the copper content from upwards of 50 ppm. to less than about 5 ppm. Under more carefully controlled conditions, such as conditions subsequently to be described, a copper level in the supernatant of less than 2 ppm. can be achieved routinely.

The reaction of the process proceeds quite rapidly at ambient plant temperatures, for example, from about 5 to 60 minutes depending on flow rates, effluent content, and other conditions, and therefore temperature control is not critical. These and other process conditions, such as pressure, sequence of admixture, proportions of reactants, flow rates and residence times, may be varied within wide limits and are not critical, except as indicated above.

The entire process may be conducted in a single reactor, preferably open to the atmosphere but also in a semi-closed system, and the process may be operated batchwise, continuously or semi-continuously. However, the reaction in a preferred embodiment is conducted in stages in which the additions of acid and peroxide are paced by the pH of the initial acidification step, and the addition of base solution in step (c) is paced by the pH upon conclusion of the peroxide-soluble metal compound additions. The flow and dosage rates are controlled so as to maximize the rate and extent of precipitation of copper compounds.

Although the process of the invention removes copper, by suitable modifications it is also effective to remove other metals and metal compounds as well from industrial process waters. This is achieved by using a metal compound in which the metal is more electropositive than the metal to be removed. For example, calcium chloride will assist in the removal of tin, nickel and lead as well as copper.

The following example illustrates a preferred embodiment of the process and should not be regarded as limiting the scope of the invention, except as set forth in the appended claims.

EXAMPLE 1

The drawing illustrates schematically one form of continuous flow operation of the process of the invention. With respect thereto, an effluent feed line 11 conveys the rinsings from the etching of copper containing substrates through a plurality of 5 gallon reaction vessels identified as Reactors I, II, III and IV. Intermediate reactors in the series are connected by suitable lines 12, 13, 14 and 15, the final vessel in the series being settling or collector tank 16. The supernatant from the process is removed for recycling or other use via outlet line 17. Reagent feed (as concentrated solutions) from source tanks or carboys A, B, C, and D is via lines 18, 19, 21 and 22, respectively, as shown. Chemical metering pumps A' and B' control the flow of acid and peroxide into Reactor I, and chemical metering pumps C' and D' control the flow of calcium chloride and base (such as sodium carbonate) to Reactors II and III, respectively. Each of the reactors is provided with mixing means such as an electrically operated propeller, as shown. pH probes 23 are mounted within Reactors I and III, the pH values being read on a control panel 24.

All electrically operated elements of the process, including the chemical metering pumps and the propeller mixers, may be wired through the control panel 24 so as to provide continuous monitoring of the process. In particular, pumps A' and B' are operated in response to preset conditions of pH in Reactor I so that metering pump A' is operative to admit acid into Reactor I until the pH is reduced to at least 3. Simultaneously, chemical metering pump B' is activated to feed peroxide to Reactor I to the appropriate preselected concentration, and pump B' remains operative, as required, to maintain the concentration. If the effluent is already acidic, the peroxide addition may be paced with the calcium chloride addition.

The flow rate through effluent feed line 11 and through the several reactors is regulated so that the proper proportions of acid, peroxide, chloride and basic salt are admitted to the effluent. The precipitation of copper is initiated in Reactors III and IV, with Reactor IV providing a digestion zone under low shear mixing. Final settling then occurs in settling tank 16. In the same manner that acid and peroxide addition to Reactor I is automatically paced by the pH in Reactor I, the addition of basic salt to Reactor III is automatically paced by the pH in Reactor III, except for the difference in pH set points.

In a specific operation of the system illustrated, sulfuric acid at a dosage rate of about 0.06 percent v/v $H_2OS_4$ (conc.) based on effluent volume was fed to Reactor I, the resultant pH 2-3 then activating pump B' and tripping the flow through line 19 of a dilute solution of hydrogen peroxide at a dosage rate of about 2 ml. $H_2O_2$ (35 percent) per gallon of reaction mixture into Reactor I. The reaction mixture of acidified effluent containing hydrogen peroxide was then directed by gravity into Reactor II, to which was fed through metering pump C' a calcium chloride solution at a dosage rate of about 2-8 grams commercial hydrated $CaCl_2$ (75 percent active) per gallon of reaction mixture. In each of the reactors agitation was provided by propeller mixers to assure complete mixing of the reactants, and to prevent undue foaming and floc floatation.

The reaction mixture was then directed through line 13 into Reactor III to which was metered from supply tank D a solution containing commercial sodium carbonate (soda ash) and commercial sodium hydroxide, in a weight ratio of about 1:4, so as to raise the pH to 8.5-9.3.

The effluent feed to Reactor I was known to contain copper in the amount of 20-50 ppm. and the clear colorless supernatant after brief settling contained less than 5 ppm. copper. Treatment of the precipitating reaction mixture in Reactor IV with a commercial flocculant accelerated settling of the precipitate, and the supernatant thereafter was found to contain less than 2 ppm. copper.

While the precise nature of the reactions taking place in the process of the invention are not fully understood, a semi-quantitative study of redox potentials at various points in the process shows that the treatment up to and including the calcium chloride addition creates strong oxidizing conditions, which are believed to destroy organic complexing agents usually present in the effluent under treatment or otherwise break up the soluble copper complexes. However, no substantial destruction of ammonium ion is evident. The calcium chloride is believed to catalyze the oxidizing action of the peroxide, as well as to provide calcium ion for displacement of copper ion from the copper complexes. During the third step of the process, in which the pH is adjusted to at least 8 by the addition of a water soluble carbonic acid salt, it is observed that the redox voltage shifts to a mildly reducing potential. The color changes accompanying this potential shift indicate that divalent copper ions are being reduced to the monovalent state, and are precipitating in that condition, possibly as cuprous hydroxide, oxide, or double salts of copper with carbonate. Since monovalent copper ions cannot as easily form complexes such as Werner type complexes, this valence change would favor calcium complex formation with any reagents that have survived the oxidation stage, and thus free the copper ions to precipitate from the reaction mixture upon contact with carbonate ion in the alkaline stage of the process. While the nature of the copper precipitate is not known with certainty, the pale green component at least would appear to be cuprous carbonate or a basic cuprous carbonate. In any event, the precipitate does not explode on drying, which might occur if it were a peroxide. Since the precipitate appears to be quite stable, disposal of the precipitate by conventional means is convenient.

TABLE I

| Example | Initial pH | First pH Adjustment | Added $H_2O_2$(ml.) | Metal Compound | Alkaline Material | Second pH Adjustment |
|---|---|---|---|---|---|---|
| 2 | 9.2 | 2.8 | 0.50 | $AlCl_3$ | $Na_2CO_3$-NaOH | 8.35 |
| 3 | do. | 3.15 | 0.25 | $AlCl_3$ | do. | 8.70 |
| 4 | do. | 3.0 | 0.25 | $Al_2(SO_4)_3$ | do. | 8.50 |
| 5 | do. | 3.3 | 0.15 | do. | do. | 8.30 |
| 6 | do. | 3.2 | 0.25 | $MgCl_2$ | do. | 8.50 |
| 7 | do. | 4.5 | 0.25 | do. | do. | 8.20 |
| 8 | do. | 4.0 | 0.25 | $MgSO_4$ | do. | 8.10 |
| 9 | do. | 3.5 | 0.25 | $FeSO_4$ | do. | 8.50 |
| | | 3.6 | 0.25 | Lime Slurry | — | 8.60 |
| 11 | do. | 3.6 | 0.25 | KMnO | Na CO -NaOH | 8.60 |
| 12 | do. | 3.1 | 0.25 | FeCl (Reagent Grade) | do. | 8.40 |
| 13 | do. | 2.8 | 0.25 | FeCl (Sewage Grade) | do. | 8.90 |
| 14 | do. | 3.2 | 0.25 | do. | do. | 8.90 |
| 15 | do. | 2.9 | 0.25 | FeCl (S.G) CaCl | do. | 8.20 |

EXAMPLES 2-15

Effluent samples (200 ml.) containing in excess of 20 ppm. copper were treated in accordance with the invention by adding sulfuric acid, then adding hydrogen peroxide and a water soluble metal compound while agitating the reaction mixture, and finally, by raising the pH to at least 8.0 by the addition of an alkaline material. The reagents and pH conditions are summarized in Table I below. Except where indicated otherwise, all reagents were about 1.0N. By each treatment the copper content was reduced to less than 2 ppm. In Example 10 the lime slurry supplied both the metal compound (CaO) and the alkaline material, thereby effectively combining two steps of the process into a single step. Although the lime could have been added as a powder to the reaction mixture, its activity was best utilized by first forming an aqueous lime slurry, and then adding the slurry to the reaction mixture.

While the invention has been illustrated and described in what are considered to be the most practical and preferred embodiments, it will be recognized that many variations are possible and come within the scope thereof, the appended claims therefore being entitled to a full range of equivalents.

I claim:

1. A process for the treatment of an aqueous effluent containing the rinsings from the etching of copper containing substrates, in order to precipitate ionic copper in said effluent, comprising the steps of:
   a. adjusting the pH of said effluent to not more than about 4.5;
   b. providing in said effluent, under conditions of vigorous agitation, hydrogen peroxide and a water soluble compound of a metal cation more electropositive than copper in the electromotive series;
   c. adding to the reaction mixture as required an alkaline material selected from lime, a water soluble salt of carbonic acid, or a mixture of lime and said salt, in an amount effective to adjust the pH of the reaction mixture to at least about 8.

2. A process as in claim 1 wherein the pH in step a) is adjusted by the addition of sulfuric acid, and wherein the salt in step c) is sodium carbonate.

3. A process as in claim 2 wherein said alkaline material includes sodium hydroxide or lime.

4. A process as in claim 1 wherein the pH in step a) is adjusted to about 2-3 and the pH in step c) is adjusted to about 9-11.

5. A process as in claim 1 wherein steps a) and b) are effected simultaneously.

6. A process as in claim 1 wherein hydrogen peroxide is added to the effluent in step b) before the water soluble compound is added, and the hydrogen peroxide addition is paced by the pH adjustment of step a) or step c).

7. A process as in claim 1 wherein all of said steps are effected in a single reaction zone.

8. A process as in claim 1 wherein the pH adjustment of step a) and the provision of hydrogen peroxide are effected in a first reaction zone, the water soluble compound addition is effected in a second reaction zone, and the pH adjustment of step c) is effected in a third reaction zone, and wherein the flow of reaction mixture is continuous from a source of said effluent sequentially through said reaction zones to a settling zone.

9. A process as in claim 8 wherein said settling zone is separated from said third reaction zone by a fourth zone comprising a precipitation and digestion zone, and the flow from said fourth zone to said settling zone is continuous.

10. A process as in claim 8 wherein said water soluble compound is calcium chloride.

11. A process as in claim 1 wherein the water soluble compound is a water soluble salt of an alkali metal, an alkaline earth metal, or metals of Groups IIB, IIIA, IVA, VIIB and VIII of the Periodic Table.

12. A process as in claim 1 wherein the water soluble compound is a water soluble salt of calcium, sodium, potassium, aluminum, magnesium, iron or manganese, and the alkaline material is lime, sodium carbonate, or a mixture of lime and sodium carbonate.

13. A process as in claim 1 wherein the water soluble compound is lime, said lime being added in an amount effective to adjust the reaction mixture to a pH of at least about 8.

* * * * *

PO-1050
(5/69)

UNITED STATES PATENT OFFICE
CERTIFICATE OF CORRECTION

Patent No. 3,816,306      Dated June 11, 1974

Inventor(s) Clarence H. Roy

It is certified that error appears in the above-identified patent and that said Letters Patent are hereby corrected as shown below:

In the Abstract, line 5, "4." should read --4.5--.
Column 2, line 5, "followd" should read --followed--.

In the Table (columns 7 and 8)
    Under the heading "Example", line 9, insert --10--.

Under the heading "Metal Compound", the following corrections should be made:

Line 10, "KMnO" should read --$KMnO_4$--.

Line 11, "FeCl (reagent" should read --$FeCl_3$ (Reagent--.

Line 13, "FeCl (Sewage" should read --$FeCl_3$ (Sewage--.

Line 16, "FeCl (S.G.)" should read --$FeCl_3$ (S.G.)--.

Line 17, "CaCl" should read --$CaCl_2$--.

Under the heading "Alakline Material", line 10, "NaCO-NaOH" should read --$Na_2CO_3$-NaOH--.

Signed and sealed this 1st day of October 1974.

(SEAL)
Attest:

McCOY M. GIBSON JR.
Attesting Officer

C. MARSHALL DANN
Commissioner of Patents